United States Patent [19]
Mattson

[11] 3,724,186
[45] Apr. 3, 1973

[54] LAWN MOWER GRASS BAG HAVING A LITTER POCKET

[75] Inventor: Charles A. Mattson, Oak Park, Ill.

[73] Assignee: Sunbeam Corporation, Chicago, Ill.

[22] Filed: Mar. 3, 1971

[21] Appl. No.: 120,443

[52] U.S. Cl. ................56/202, 15/83, 55/366, 55/367, 55/369, 55/377, 55/379, 55/381
[51] Int. Cl. ................................A01d 35/22
[58] Field of Search ......56/194, 202, 203; 15/79, 83; 55/366, 367, 369, 370, 377, 379, 381, 473

[56] References Cited

UNITED STATES PATENTS

| | | | |
|---|---|---|---|
| 3,421,302 | 1/1969 | Dahl | 56/202 |
| 2,932,146 | 4/1960 | Campbell | 56/202 |
| 3,468,108 | 9/1969 | Mattson | 56/202 X |
| 3,579,966 | 5/1971 | Allina | 56/202 |
| 3,386,234 | 6/1968 | Leader | 56/202 |
| 3,192,692 | 7/1965 | Slemmons | 56/202 X |
| 2,942,396 | 6/1960 | Farnam | 56/194 X |
| 2,783,604 | 3/1957 | Cahill, Jr. | 56/202 |

Primary Examiner—Louis G. Mancene
Assistant Examiner—J. A. Oliff
Attorney—George R. Clark

[57] ABSTRACT

A grass collection bag assembly for receiving the cut grass clippings is releasably mounted on a rotary power mower in register with the mower discharge chute. The assembly includes a bag which is provided with a closable opening for disposing of the collected clippings. A litter pocket opening is also provided on the bag for receiving objects or debris which the lawn mower operator has picked up by hand. The pocket opening is designed such that the items deposited therein may be disposed of at the same time the collected grass clippings are emptied from the bag. In one embodiment, a pocket separate from the grass clipping retaining portion of the bag is provided, while in other embodiments the pocket opening communicates directly with the grass clipping retaining portion of the bag, and the items deposited therein intermingle with the collected grass clippings.

11 Claims, 8 Drawing Figures

PATENTED APR 3 1973

Inventor:
Charles A. Mattson
By John S. Pacocha
Atty.

PATENTED APR 3 1973
3,724,186
SHEET 2 OF 2
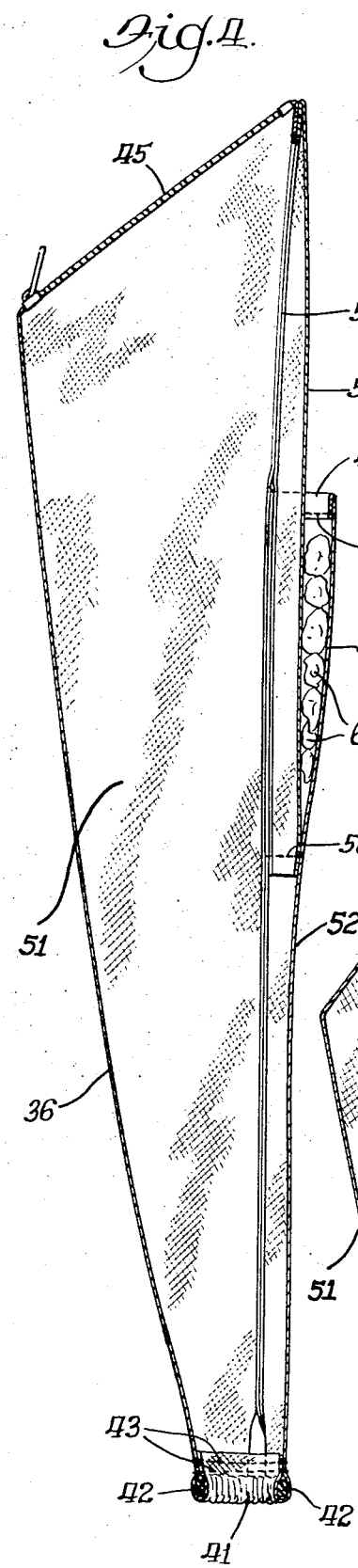
Fig. 4.
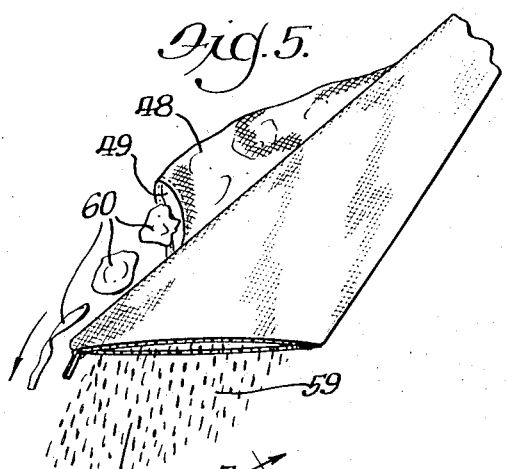
Fig. 5.
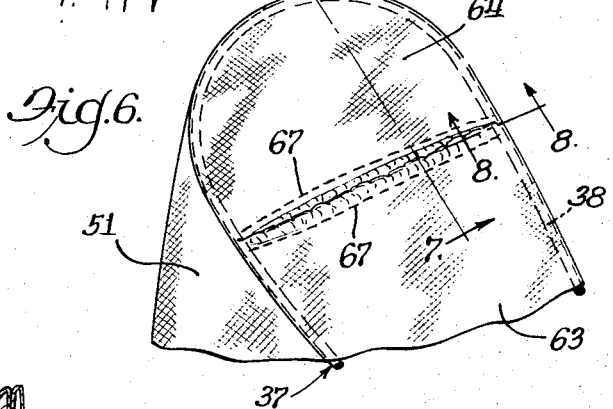
Fig. 6.
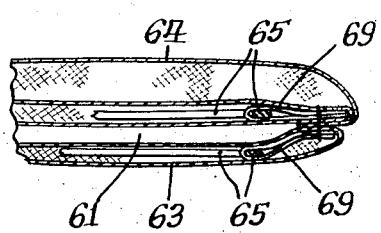
Fig. 8.
Fig. 7.
Inventor:
Charles A. Mattson
By John S. Pacocha
Atty.

LAWN MOWER GRASS BAG HAVING A LITTER POCKET

BACKGROUND OF THE INVENTION

Rotary power mowers have become increasingly popular due to their ability to effectively cut grass and collect the clippings. In the use of such mowers, however, it is necessary to exercise a degree of care in order to avoid injury to the operator. Such care is required in view of the high speed of revolution of the rotary cutting blade. One particular safety precaution urged by manufacturers of rotary power mowers and the Outdoor Power Institute, Inc., is that objects which might be picked up and thrown by the lawn mower be removed prior to mowing the area. Compliance with this safety suggestion does not present any problems with respect to extremely large items which are easily observed upon a general survey of the area about to be mowed. However, smaller items such as stones and sticks which could present serious safety hazards are not always apparent to the operator until he is in fairly close proximity to them. In such circumstances, it is a common practice for the operator to merely pick up such items at the time he observes them. But, disposing of the objects picked up by the operator during the mowing operation presents a problem. It is inconvenient and inefficient for the operator to completely cease his mowing operation and walk to a distant receptacle to deposit the objects therein. The number of such objects which an operator may retain on his person, either by holding them or placing them in the pockets of his clothing, is limited. In addition, the practice of holding these objects is not desirable in that it does not permit the operator complete use of his hands to control the mower. Placing the objects in the pockets of the operator's clothing has obvious inherent disadvantages. Accordingly, it would be desirable for the operator to have a portable receptacle for the deposit of such objects which could be carried with him as he mows the lawn. It would be even more desirable to have such a portable receptacle carried by the mower rather than upon the body of the operator. In addition to having a receptacle for such objects or litter available at all times while mowing the lawn, it would be desirable to be able to empty such a receptacle with a minimal amount of additional effort over that required to dispose of the collected grass clippings.

SUMMARY OF THE INVENTION

The present invention is concerned with providing a portable, convenient receptacle carried by the rotary mower to receive objects or litter picked up by the operator during the mowing operation. Rotary power mowers are usually operated with a releasably attached collection bag for receiving the cut grass clippings. In order to economically provide such a receptacle without requiring additional attachments for the mower, the grass collection bag is provided with means enabling it to also function as such a receptacle for manually collected objects or litter. An open end of the grass collection bag is releasably attached to the power mower housing to receive the cut grass clippings. At the opposite end of the bag there is provided a closable opening to permit disposal of the collected clippings. On an upwardly facing portion of the collection bag intermediate the ends and easily accessible to the mower operator, there is provided a pocket opening for the deposit of any objects, debris or litter which the operator may pick up during the mowing operation.

Accordingly, it is an object of the present invention to provide a pocket on the lawn mower grass collection bag into which objects, debris and litter picked up by the operator may be deposited.

It is a further object of the present invention to provide a litter pocket on a lawn mower grass collection bag which may be emptied at the same time the grass clippings collected therein are disposed of with a minimum amount of additional effort on the part of the operator.

It is another object of the present invention to provide a lawn mower grass collection bag with a litter pocket in an economical manner that requires a minimum amount of additional material and labor in the manufacture of such a bag.

BRIEF DESCRIPTION OF THE DRAWINGS

For a better understanding of the present invention, reference may be had to the accompanying drawings in which:

FIG. 4 is a sectional view of the bag without the supporting frame taken substantially along line 4—4 of FIG. 1;

FIG. 5 is a fragmentary side elevational view of the grass bag assembly illustrating the disposal of the grass clippings and litter;

FIG. 6 is a fragmentary perspective view of an alternate embodiment of the bag;

FIG. 7 is a fragmentary sectional view of the bag without the supporting frame taken substantially along line 7—7 of FIG. 6; and FIG. 8 is a fragmentary sectional view of the bag without the supporting frame taken substantially along line 8—8 of FIG. 6.

DESCRIPTION OF THE PREFERRED EMBODIMENT

Figure 1:
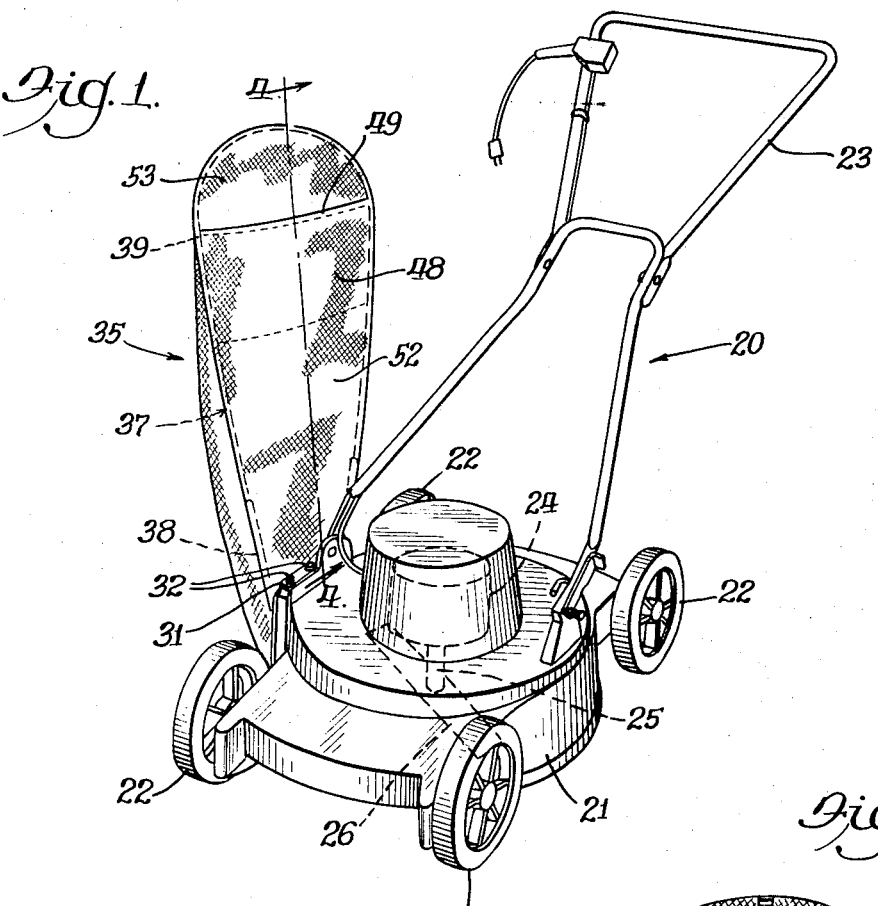
FIG. 1 is a perspective view of a rotary power mower having a grass collection bag embodying the present invention attached thereto.

Referring now to the drawings in which like parts are designated by like reference numerals in the various views, there is illustrated in FIG. 1 an electrically operated rotary power mower referred to generally by the reference numeral 20. The lawn mower 20 is preferably manufactured in keeping with the lawn mower disclosed in U.S. Pat. No. 3,468,108, which is assigned to the same assignee as the present application. Although FIG. 1 shows an electrically operated mower and the mower disclosed in U.S. Pat. No. 3,468,108 is also an electrically operated mower, for the purposes of this invention it makes no difference whether the mower is electrically operated or powered by a gasoline engine.

Figure 2:
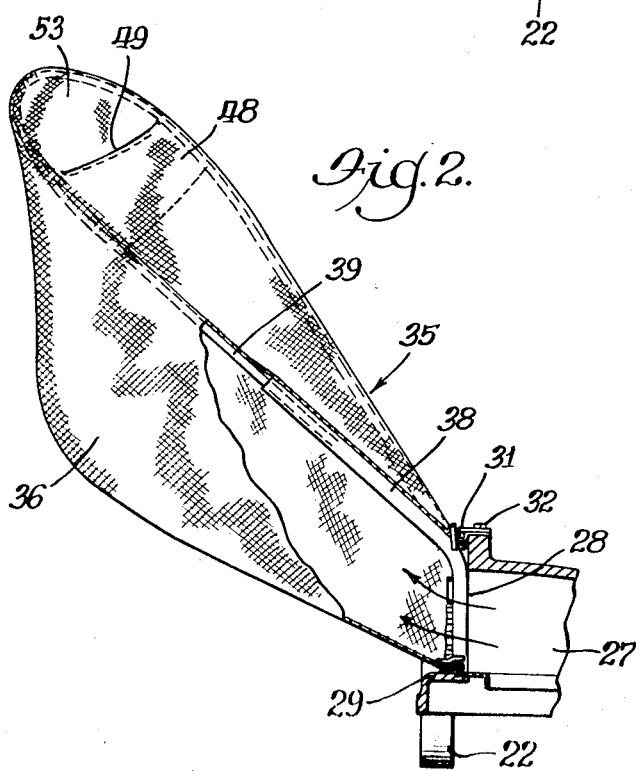
FIG. 2 is a front elevational view of the bag mounted upon a mower with a fragmentary showing of the portion of the lawn mower housing in section through the discharge chute and opening.

As shown in FIG. 1, the lawn mower 20 has a cup-shaped housing 21 supported by a plurality of wheels 22 for movement on a lawn. A handle 23 is mounted on the housing to enable the operator to push the mower across the lawn and to guide the mower. Mounted on the housing 21 is an electric motor assembly 24 having an output shaft 25 extending downwardly beneath the housing 21. Securely attached to output shaft 25 is a blade 26 for cutting the grass. Housing 21 is formed with a discharge chute 27 terminating at a discharge opening 28. As the blade 26 rotates, cutting the grass, air and the cut clippings are expelled through the chute 27 and opening 28. The portion of the lawn mower housing 21 defining the discharge opening 28 has a horizontal wall surface 29. An L-shaped bracket 31 is secured above the discharge opening 28 by a plurality of bolts 32 as shown in FIG. 2.

For collecting the cut grass clippings there is provided a grass collection bag assembly 35. The assembly 35 comprises an elongated, flexible bag 36 supported by a rigid frame 37. The rotary cutting action of the blade 26 within the housing 21 causes the cut grass clippings as well as a relatively large volume of air to be expelled through the discharge chute 27 and out the discharge opening 28. The bag 36 therefore, is made of a porous material which allows air to easily pass therethrough while entrapping the cut grass clippings. The rigid frame 37 comprises a lower member 38 and an upper U-shaped rod 39 which is slidably received in the lower member 38. The lower frame member 38 is formed so as to define an opening which registers with the lawn mower discharge opening 28. The L-shaped bracket 31 and the horizontal wall surface 29 of the housing removably support the grass bag assembly in register with the discharge opening 28. A number of projections (not shown) are attached to the lower frame member 38 to secure the inlet opening 41 of the flexible bag around the portion of the lower frame member defining the opening. In order to hold the inlet opening in its proper position, the bag is preferably provided with an elastic band 42 around the inlet opening. The elastic band is secured about the inlet opening by placing it inside an inwardly folded facing which is sewn closed with stitching 43. The manner in which the flexible bag 26 is secured and supported upon the rigid frame 37, and the manner in which the grass bag assembly 35 is releasably mounted on the lawn mower 20 is shown and described in greater detail in U.S. Pat. No. 3,468,108. In order to facilitate the removal of the collected grass clippings 59 from the bag 36, the bag is provided with a zippered opening 45 at the opposite end from the inlet opening 41.

In accordance with the present invention, the bag 36 is provided with a pocket 48 to receive any objects or litter 60 which the operator may pick up by hand while mowing the lawn. The bag 36 is made of two identical side panels 51, a lower top panel 52 and an upper panel 53. The panels 52 and 53 are formed and positioned so that overlapping portions form the pocket 48. The side panels 51 are substantially triangular in shape and are joined together along their lower edges by stitching 54. Another edge of each of the side panels 51 is sewn to a respective tab of a zipper to form the generally vertically extending zippered opening 45. The remaining edge of each of the side panels 51 is secured by means of side stitching 55 to respective edges of the lower and upper top panels 52 and 53 as best shown in FIG. 4.

Panels 52 and 53 form the upwardly facing portion of the grass bag assembly when it is mounted on the mower. The lower top panel 52 overlaps a portion of the upper top panel 53. The side edges of the overlapping portions of these panels are secured to the respective side panels 51 by means of the stitching 55 joining each side panel 51 to the top panels 52 and 53. Stitching 58 joining the bottom edge of the upper top panel 53 to an intermediate portion of the lower top panel 52 both completes the enclosure defining the grass collection bag and forms the bottom of the litter pocket 48.

Prior to assembly of the various panels, the top edge of the lower panel 52 is hemmed by means of stitching 57 to prevent fraying of this edge which defines the pocket opening 49. Thus, with a minimal amount of additional material and stitching over that required to otherwise form the flexible bag 36, there is provided a pocket which is easily accessible to the lawn mower operator for receiving objects and litter 60 that he has picked up while mowing the lawn. The opening of the pocket is facing outwardly from the mower in the same direction as the opening 45 so as to permit the objects 60 deposited in the pocket to be emptied therefrom at the same time that the collected grass clippings 59 are disposed of through the zippered opening 45 by removing the grass bag assembly 35 from the mower and inverting it over a suitable receptacle.

Figure 3:
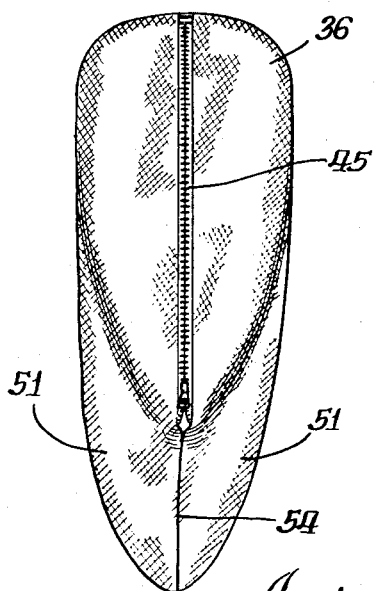
FIG. 3 is a rear elevational view of the bag as it would appear mounted on a mower.

In another embodiment of the present invention which is not specifically shown in the drawings, the pocket communicates directly with the inside of the bag 36 wherein the grass clippings are collected. In this embodiment, the bag is formed substantially as described with respect to the preferred embodiment and as shown in FIGS. 3 and 4 except that the stitching 58 forming the bottom of the pocket is omitted to enable the objects or debris deposited in the pocket to drop directly into the grass clipping retaining portion of the bag 36. The overlapping portions of the lower and upper panels 52 and 53 provide an effective seal against the expulsion of the grass clippings from the bag during the mowing operation.

There is shown in FIGS. 6, 7 and 8 another alternative embodiment of the present invention wherein the pocket communicates directly with the grass clipping retaining portion of the bag. The bag 36 is supported by a rigid frame 37 releasably registrable with the discharge opening 28 in the same manner as the preferred embodiment. In this embodiment, the pocket opening 61 is formed by the top edge of lower top panel 61 and the bottom edge of lower top panel 64. The pocket opening is sealed to prevent the expulsion of grass clippings from the bag during the mowing operation by means of elastic bands 65. The construction of the bag is substantially as described in the preferred embodiment except that the lower top panel 63 and the upper top panel 64 do not overlap. The panels 63 and 64 are each cut with extra material at their top and bottom edges, respectively. This facing is then folded inwardly, and an elastic band 65 is placed therein. The facing folds are sewn closed with stitching 67. Each elastic band 65 is a closed loop. The elastic band loops in both the lower panel 63 and the upper panel 64 are held by tabs 69 which are secured by side stitching 55.

Thus, when the flexible bag 36 is stretched over the upper U-shaped rod 39 of the frame 37, the elastic bands 65 are stretched to close the opening 61 as is shown in FIG. 6. When the operator wishes to deposit litter he merely spreads the elasticized edges of panels 63 and 64 apart and deposits the litter through pocket opening 61 directly into the bag 36. The collected debris or litter is disposed of along with the collected grass clippings through zippered opening 45.

While particular embodiments of the present invention have been illustrated and described, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. A grass collection bag assembly for a power rotary mower having a housing and a discharge opening in the housing through which cut grass clippings are discharged, comprising a rigid frame member, said frame member being releasably supportable on said housing with one end of said frame member in register with the mower discharge opening, a plurality of panels defining a flexible elongated bag which forms an enclosure, said bag being supportable on said frame member, said bag extending in a longitudinal direction when supported on said frame, said bag having an inlet opening at one end, said inlet opening being securable adjacent said frame end to collect the discharged grass clippings, the opposite end of said bag having a closable opening for disposing of the collected grass clippings, said bag having a substantially planar top portion extending in said longitudinal direction and upwardly facing when said bag is supported upon said frame member and said frame member is supported upon the mower, said top portion being formed of two of said panels, and said two panels also forming a pocket opening for litter in said top portion intermediate said bag ends.

2. A grass collection bag assembly as defined in claim 1 wherein said pocket opening is transverse to said longitudinal direction, and overlapping parts of said two panels form a pocket on said top portion.

3. A grass collection bag assembly as defined in claim 2 wherein said pocket opening is disposed outwardly in said longitudinal direction away from said inlet opening and toward said closable bag opening for allowing simultaneous disposal of litter deposited in said pocket with disposal of grass clippings from said closable bag opening.

4. A grass collection bag assembly as defined in claim 2 wherein said two panels are a lower panel and an upper panel, a top part of said lower panel overlapping a bottom part of said upper panel to define said pocket.

5. A grass collection bag assembly as defined in claim 1 wherein said pocket opening communicates directly with said bag enclosure.

6. A grass collection bag assembly as defined in claim 5 wherein elastic bands are secured within the edges of said two panels defining said pocket opening to prevent the expulsion of grass clippings during the mowing operation.

7. A grass clipping collection bag assembly for a power rotary mower comprising an elongated flexible bag enclosure, a plurality of panels defining said bag, an inlet opening at one end of said bag, a zippered opening at the other end of said bag to facilitate disposing of the collected grass clippings, a substantially planar portion of said bag extending in a longitudinal direction between said inlet opening and said zippered opening, two of said plurality of panels forming said portion, said two panels also forming a pocket opening for litter in said portion transverse to said longitudinal direction and intermediate said inlet opening and said zippered opening.

8. A grass clipping collection bag assembly as defined in claim 7 wherein overlapping portions of said two panels define a pocket.

9. A grass clipping collection bag assembly as defined in claim 8 wherein said pocket opening is disposed outwardly from said longitudinal direction away from said inlet opening and toward said zippered opening for allowing simultaneous disposal of litter deposited in said pocket with disposal of grass clippings from said zippered opening.

10. A grass clipping collection bag assembly as defined in claim 7 wherein said two panels define a pocket opening that communicates directly with said bag enclosure.

11. A grass clipping collection bag assembly as defined in claim 10 wherein elastic bands are secured within the edges of said two panels defining said pocket opening to prevent the expulsion of grass clippings during the mowing operation.

* * * * *